Feb. 19, 1952  A. E. GRUSELL ET AL  2,586,426
GALVANIC PRIMARY CELL
Filed Feb. 3, 1948
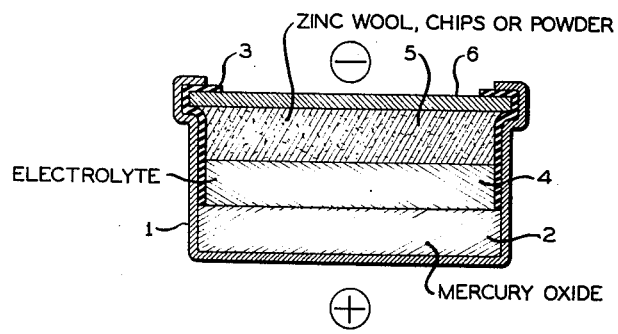
*INVENTORS*
ANDERS ERIK GRUSELL
HELGE OLOF ANDERS SANDMARK
ERIK GUSTAF HYSING
BY *Jarvis C. Marble*
ATTORNEY Patented Feb. 19, 1952

2,586,426

UNITED STATES PATENT OFFICE 2,586,426

GALVANIC PRIMARY CELL

Anders Erik Grusell, Enskede, and Helge Olof Anders Sandmark and Erik Gustaf Hysing, Stockholm, Sweden, assignors to Aktiebolaget Kontrollinstrument, Stockholm, Sweden, a corporation of Sweden Application February 3, 1948, Serial No. 5,956
In Sweden January 18, 1947

3 Claims. (Cl. 136—107)

1

The present invention relates to that kind of galvanic primary cells, which have a cathode of some negatively reacting metal such as zinc or some similar material, and an anode of an oxide of a metal, which is positioned rather high up in the periodic system. It is known that such metal oxides react positively in galvanic cells. Particularly useful for this purpose is mercury oxide, but it has also been proposed to use, for example, molybdenum oxide, tungsten oxide and so on. Such cells have certain advantages in use, among which should be mentioned the possibility of storing them for a long time without considerable loss of capacity, as well as the fact that they maintain practically full voltage until immediately before they are fully discharged. Another advantage is their simple character, in that they do not require a separate depolarizer, because the metallic oxide itself functions as an oxidizer for the hydrogen from the electrolyte, liberated by the polarization.

Cells of the present kind, however, have found no greater use, in spite of these advantages which should make them very useful for certain purposes. For instance, the cells are specially needed for such purposes where they should be able to give off a very great charge at once, as in certain military blasting projectiles, mines and the like, because such explosive objects must often be stored for a long time without the risk that during the interval the cell will become useless due to selfdischarging. But even for such purposes the cells of the kind hitherto known are not well adapted because they have too great internal resistance and, consequently, too small a short circuit current.

The present invention is based upon the realization that this fact depends upon the contact resistance between the electrolyte and each of the electrodes. It is known that a small contact resistance is required at the negative electrode in other kinds of primary cells such as zinc-carbon cells, because one has supposed that it would be essential that the electrode which gives off to the outer conductor the electrons obtained from the electrolyte, must have a small resistance against electron absorption. However, the resistance against giving off electrons of the positive electrode was never regarded with special reference to the demand of obtaining a great short circuit current, especially because this electrode was normally made of carbon, said material having an extremely small contact resistance.

Metallic oxides of the kind here proposed as positive electrode material, for instance mercury oxide, molybdenum oxide and tungsten oxide, re-

2 act, however, in this respect in a different way. Experimentally it has been proved in connection with the present invention that a very great increase of the short circuit current may be obtained from a cell of the kind now under consideration, in which the positive electrode simultaneously functions as a depolarizer, if both of the electrodes are made of a finely divided material in the way known with respect to a pure zinc electrode.

A further improvement of the short circuit current in a primary cell of the above stated kind is obtained if the finely divided anode material is mixed with small quantities of finely powdered graphite.

Practical experiments have, however, proved that a negative electrode in the form of zinc, finely divided into the form of powder or chips, has a tendency of caking together so that sufficient porosity is not obtained. The advantage obtained by making the zinc surface very great in relation to the quantity of zinc by finely dividing it, and thus presenting the possibility of giving a relatively high short circuit current, is lost to a substantial extent in that the electrolyte cannot penetrate the inner parts of the electrode sufficiently rapidly, so that great parts of its surface will be in contact with polarized electrolyte which does not participate in the normal way in the creation of the voltage.

According to a very important embodiment of the present invention, this disadvantage is eliminated in that the electrode is made of zinc wool or in other words is composed of a mass of more or less irregularly mixed threads or fibres or long chips of the metal in question, all of which are included in the expression "zinc wool." Such a mass has high elasticity and by applying the suitable amount of pressure is given substantially the optimum degree of porosity in relation to the metallic surface.

By this arrangement a plurality of further advantages are gained. Firstly, an electrode of the kind described above has no tendency of caking together into only a very slightly porous body, and thereby the electrolyte has sufficiently free access to all parts of the surface of the electrode. Secondly, the electrode, due to its great porosity, will absorb an essential part of the electrolyte, so that less space will be required within the cell for free electrolyte. Thereby, the total volume of the cell for a predetermined current-time-capacity will be made smaller, or conversely, the cell may be given a greater current-time-capacity for a given volume. Further, less internal resistance occurs dependent upon a plurality of circumstances, as for instance the shorter dissociation space between the positive and the negative electrodes, the improved surface contact between the electrolyte and the zinc electrode, the possibility to reduce the amount of paper to be used when the cell is made with insulation sheets of for instance paper, and so on. All this results in a greater short circuit current and smaller internal losses, which gives more effective power. Finally, cells made according to this invention on a factory scale in increasing quantities are more uniform in their characteristics.

The thickness of the zinc thread material used for forming the zinc wool should be determined with respect to the magnitude of the elements, so that thicker zinc thread or zinc chips are used for larger cells.

The above described galvanic cells are especially useful in such cases when there is required a galvanic element that must be small, have a convenient size that allows mounting of the cell in a narrow constructional unit, and allow a high short circuit current. By practical tests it has been proved that the more or less flattened case form is especially useful for this purpose. In such a galvanic cell one will further find other advantages, among others that one that the cathode, the electrolyte and the anode are all formed in plane and parallel layers, which may under certain conditions help in obtaining a greater short circuit current in relation to the weight and dimensions of the cells. Further, the construction is cheap and the manufacturing is simple.

One embodiment of the invention is illustrated in the accompanying drawing in connection with the following description. The drawing shows in section a galvanic primary cell according to the invention.

In a metallic case, preferably an iron case 1, the positive electrode material, in this case mercury oxide or some other suitable oxide of a metal, has been applied in a finely divided state and has been compressed into a plate 2. The case 1 is, on its inside, insulated with a layer of suitable insulating material 3, which should be non-hygroscopic and resistant to the corroding action of the electrolyte. Rubber and some kinds of artificial resins, for instance, may be used for this purpose. On the plate 2 the electrolyte 4 rests, and this should be mixed with or absorbed by a filling material of such a kind, that a mass is formed, which is sufficiently firm so that the finely divided cathode electrode will not penetrate too deeply into the electrolyte. Simultaneously, the mass of electrolyte and filling material for it must be sufficiently plastically flowable to enclose the closest grains or particles of the cathode, when this is pressed into the case. Over the electrolyte, finally, the cathode 5 follows, which consists of pure zinc in finely divided state, such as zinc wool or chips or powder. The zinc layer is kept pressed against the electrolyte by means of the cover 6, which should be made from electrically conducting material. When the cover is pressed down in its place, the edge of the case is bent inwardly, so that the cover is kept tightly in its place. The insulating layer 3, which is thereby pressed between the cover and the bent over edge, simultaneously serves as insulation and for tightening the cover in place.

What is claimed is:

1. A galvanic, primary, dry cell having as its positive electrode substance a depolarizing oxide of a metal in substantially finely divided form, zinc as its negative electrode substance, and an electrolyte between them, and in electronically-conductive contact respectively with them, characterized by the fact that finely powdered graphite is dispersed throughout the positive electrode depolarizing oxide of a metal and the zinc constituting the negative electrode substance is present in the form of compressed zinc threads.

2. A galvanic, primary, dry cell having as its positive electrode substance a depolarizing oxide of a metal in substantially finely divided form, zinc as its negative electrode substance, and an electrolyte between, and in electronically-conductive contact respectively with them, characterized by the fact that the zinc constituting the negative electrode substance is present in the form of compressed zinc threads.

3. A galvanic, primary cell as claimed in claim 1, wherein the depolarizing oxide of a metal is a member of the class consisting of mercury oxide, molybdenum oxide and tungsten oxide.

ANDERS ERIK GRUSELL.
HELGE OLOF ANDERS SANDMARK.
ERIK GUSTAF HYSING.

REFERENCES CITED

The following references are of record in the file of this patent:

UNITED STATES PATENTS

| Number | Name | Date |
|---|---|---|
| 267,860 | Finney | Nov. 21, 1882 |
| 1,272,952 | Holmes | July 16, 1918 |
| 1,281,372 | Holmes | Oct. 15, 1918 |
| 2,422,045 | Ruben | June 10, 1947 |

FOREIGN PATENTS

| Number | Country | Date |
|---|---|---|
| 201,068 | Germany | July 29, 1908 |